(12) United States Patent
Vandroux et al.

(10) Patent No.: US 9,812,132 B2
(45) Date of Patent: Nov. 7, 2017

(54) ACOUSTIC MAP COMMAND CONTEXTUALIZATION AND DEVICE CONTROL

(71) Applicant: GENERAL ELECTRIC COMPANY, Schenectady, NY (US)

(72) Inventors: Stéphane Vandroux, Paris (FR); Mireille Haddad, Villejuif (FR); Patrice Riou, Fontenay aux Roses (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 20 days.

(21) Appl. No.: 14/986,613

(22) Filed: Dec. 31, 2015

(65) Prior Publication Data

US 2017/0194008 A1   Jul. 6, 2017

(51) Int. Cl.

| | | |
|---|---|---|
| *G10L 21/00* | (2013.01) | |
| *G10L 17/22* | (2013.01) | |
| *G10L 15/18* | (2013.01) | |
| *G10L 15/00* | (2013.01) | |
| *G10L 21/028* | (2013.01) | |
| *G10L 25/93* | (2013.01) | |
| *G10L 15/22* | (2006.01) | |

(52) U.S. Cl.
CPC ............ *G10L 17/22* (2013.01); *G10L 15/005* (2013.01); *G10L 15/1822* (2013.01); *G10L 21/028* (2013.01); *G10L 25/93* (2013.01); *G10L 2015/223* (2013.01)

(58) Field of Classification Search
CPC ........ G06F 3/017; G06F 3/011; G06T 19/006; G02B 27/017; G02B 2027/014

USPC ...... 600/407, 424, 427; 342/14, 53; 89/1.11; 725/14, 18; 324/338; 704/275
See application file for complete search history.

(56) References Cited

U.S. PATENT DOCUMENTS

| | | | |
|---|---|---|---|
| 6,415,257 B1 | 7/2002 | Junqua et al. | |
| 6,980,152 B2* | 12/2005 | Steadman | F41H 11/02 |
| | | | 342/14 |
| 9,344,773 B2* | 5/2016 | Hayton | G06Q 30/0631 |
| 2009/0055178 A1 | 2/2009 | Coon | |
| 2015/0279368 A1 | 10/2015 | Contolini et al. | |

OTHER PUBLICATIONS

Katsamanis A et al., "Robust Far-Field Spoken Command Recognition for Home Automation Combining Adaptation and Multichannel Processing", 2014 IEEE International Conference on Acoustics, Speech and Signal Processing, May 4, 2014, pp. 5547-5551.
International Search Report and Written Opinion for corresponding PCT application No. PCT/US2016/055355 dated Jan. 2, 2017; 15 pages.

* cited by examiner

*Primary Examiner* — Charlotte M Baker

(57) ABSTRACT

Provided is a system where users performing a coordinated process are localized in a complex environment based upon audio input. Audio commands are detected and executed based on system user vocalization. Available commands are limited by user status, location, process type and process progress. Command execution is limited by the presence and locations of system users, non-users, or extraneous equipment.

19 Claims, 4 Drawing Sheets

ACOUSTIC MAP COMMAND CONTEXTUALIZATION AND DEVICE CONTROL

BACKGROUND

Those who create and maintain complex environments face the constant challenge of reducing or eliminating contaminant elements brought in by the presence of users. Additionally, there is also the threat of equipment-to-equipment and equipment-to-process cross-contamination as users move and interact with the various pieces of equipment needed to perform a process (i.e., touching a computer screen, handling an x-ray emitter, positioning a lamp, reaching for instruments from a tray).

BRIEF DESCRIPTION

In one or more embodiments, a method executed by a machine or system is described wherein one or more acoustical sensors are placed in an environment in order to localize and identify one or more system users performing, or part of, a coordinated process. The method assigns identified system users relevant command schemes based on their role in and overall progress of the coordinated process. The method enables the movement of relevant materials from a first location to at least one additional location in response to commands from a user. The method further enables the performance of relevant automated procedures localized to the space of a user without endangering the command-issuing user, other nearby users. The method also enables multiple users in multiple roles to command and control automated equipment without the equipment impinging upon the space of other users or equipment. Finally, the method prioritizes and makes user commands available based on the overall progress of the coordinated process and the status of other relevant users.

Procedures carried out in complex environments are often intricate with multiple overlapping steps that often involve multiple users working to a coordinated process. The execution of a coordinated process may sometimes require the presence of additional users, each possessing varying degrees of authority and relevance to the coordinated process, internal or external to the environment. Additional users may have various degrees of authority over the progression of the coordinated process ranging from full authority to completely passive. Users external to the complex environment are often limited in their ability to manipulate equipment internal to the environment due to restricted access and visibility into the environment. Additional internal users represent a further strain on the complex environment infrastructure, increase the hazards for moving automated equipment, and increase the overall likelihood of cross-contamination.

Complex environments are often also information rich as users must often be aware of multiple process variables and must usually be aware of and react to changes in those variables. Further, each user must typically be aware of the overall progress of the process and the activities of each user must be synched to the various stages of the executed process.

In an example embodiment there is a process comprising: grouping audio sensors into an acoustical array sensor; placing at least one acoustical array sensor in proximity to multiple users; registering a first audio input; recognizing a first user based upon the first audio input; localizing a first user based upon the first audio input into at least one acoustical array sensor; and assigning an authority level to the first authorized user based upon the first audio input. Additionally, the process comprises presenting a list of commands available to the first authorized user based on the first audio input; enacting a chosen command, from the list of commands, based upon a second audio input from the from the first user; and recognizing and localizing at least one additional user through vocal or non-vocal audio signal; limiting the execution of the first user chosen command based upon the locations of either the first user or at least one additional user.

Another embodiment is illustrated by a system comprising: acoustical sensors disposed as an array, coupled to an analog to digital converter and a digital data output transceiver, forming an acoustic array sensor; at least one acoustic array sensor operatively connected to an audio analysis processor; and the audio analysis processor operatively connected to a command database and a control module. In at least one embodiment, at least one of the command database and control module is operatively connected to one or more machines, or in some cases to a plurality of machines, wherein the machines may or may not be automated.

Another example embodiment can be found in an audio command and control method comprising: placing at least one acoustic array sensor in each of at least one distinct environment, said environment containing a multiplicity of users and automated equipment, said users engaged in a coordinated process; parsing the signals from at least one acoustic array sensor to determine the identities and locations of users and equipment; and presenting to users a specialized command list tailored to location, user authority, and coordinated process timeline. Further, the method comprises engaging and positioning automated equipment in response to user command; limiting the engagement and position of automated equipment in response to a user, non-user, or equipment presence and location; presenting to users a specialized command list tailored to location, user authority, and coordinated process timeline; engaging and positioning automated equipment in response to user command; and limiting the engagement and position of automated equipment in response to user presence and location.

DRAWINGS

These and other features, aspects, and advantages of embodiments of the invention will become better understood when the following detailed description is read with reference to the accompanying drawings in which like characters represent like parts throughout the drawings, wherein.

DETAILED DESCRIPTION

Embodiments of the invention relate to using audio sensors to localize individual system users in complex environments. As used throughout, the terms "complex environment" or "environment" are synonymous and define an area wherein automated equipment is present near system users or subjects. As described below, a particular embodiment of this environment includes a surgical suite with multiple pieces of automated technology including, but not limited to: information displays or processing equipment; instrument trays; patient support equipment; diagnostic machinery; environmental controls; and other pieces of specialized equipment or material subject to handling by such equipment. However, alternative embodiments include, but are not limited to: operating theaters, sensitive electronic equipment assembly areas, cell culture and bioprocessing facilities, food processing facilities, etc. The term "external environment" is taken to mean, in the broadest sense, as an area not incorporated within the complex environment. External environments may be adjacent to the complex environment or remote with varying degrees of access and control capability within a complex environment. External environments may be capable of monitoring and controlling multiple separate or conjoined complex environments.

As used throughout, the term "acoustic array sensor" or "array" refers to either separate individual sensors located in an environment and operably connected with the larger system, or individual audio sensors grouped together as part of a single device which is then operably connected with the larger system, or a combination thereof.

As used throughout, the term "user" describes an active or passive human or animal which the system locates; by way of illustrative example, an active user would include a surgeon and multiple support personnel; whereas a passive user would include a patient, conscious or not, tracked by the system. Another illustrative example would include a veterinarian and support staff as active users and an animal and owner as passive users.

And as used throughout, the term "automated" shall mean that the associated machine, piece of equipment and/or system will operate automatically upon command with or without one or more intervening user interactions.

Figure 1:
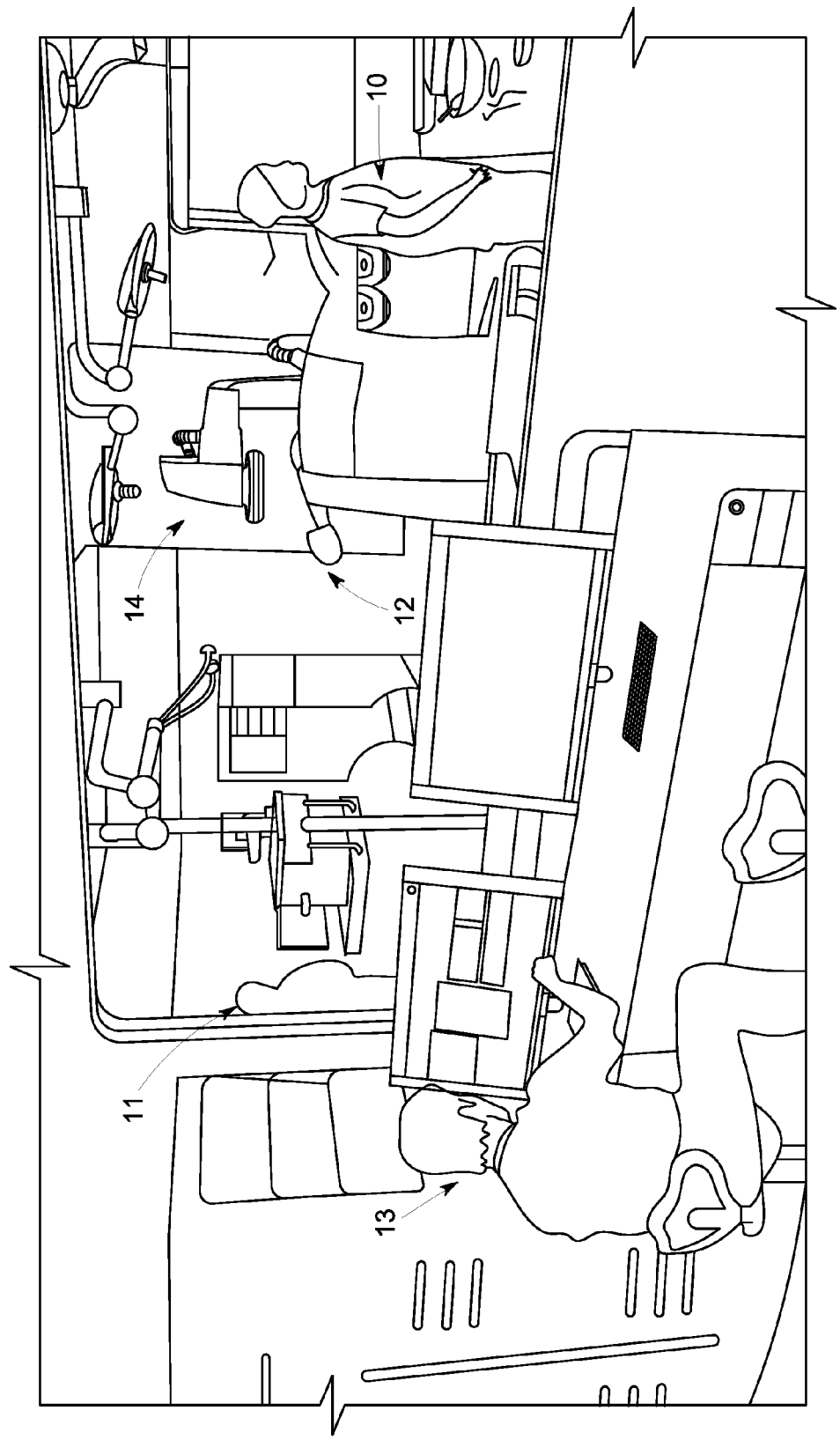
FIG. 1 illustrates an example complex environment with an adjacent environment.

FIG. 1 illustrates an example embodiment of a complex environment in the form of a surgical suite as viewed through a window from an adjacent external environment. The complex environment contains a lead user 10, a support staff member 11, and one passive user in the form of a patient 12. Another user separated from the complex environment 13 monitors the procedure performed on the patient by automated equipment 14.

Figure 2:
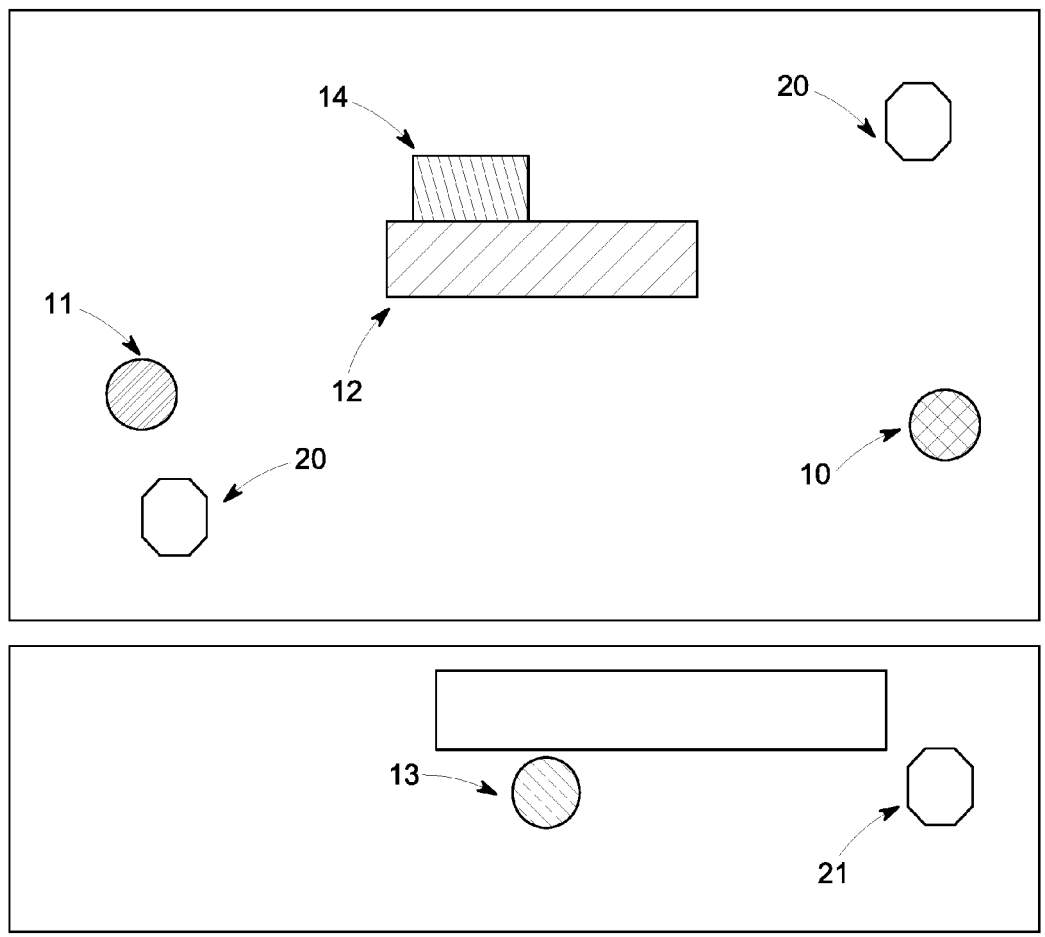
FIG. 2 illustrates an overhead schematic of an example complex environment with an adjacent environment.

FIG. 2 represents an overhead view of the complex and external environments illustrated in FIG. 1. In this instance, the complex environment contains a lead user 10, a support staff member 11, one passive user in the form of a patient 12, and automated equipment 14. Another user separated from the complex environment 13 is also represented. Acoustical array sensors 20 and 21 are positioned to provide optimal audio pickup for command localization. Acoustical array sensors can work as a multiple group as illustrated by element 20 or as a standalone sensor as illustrated by element 21. Not shown are command and control modules, and an audio analysis module which may be located in the complex environment, in the adjacent environment, in a combination thereof, or in a completely separate environment altogether.

Figure 3:
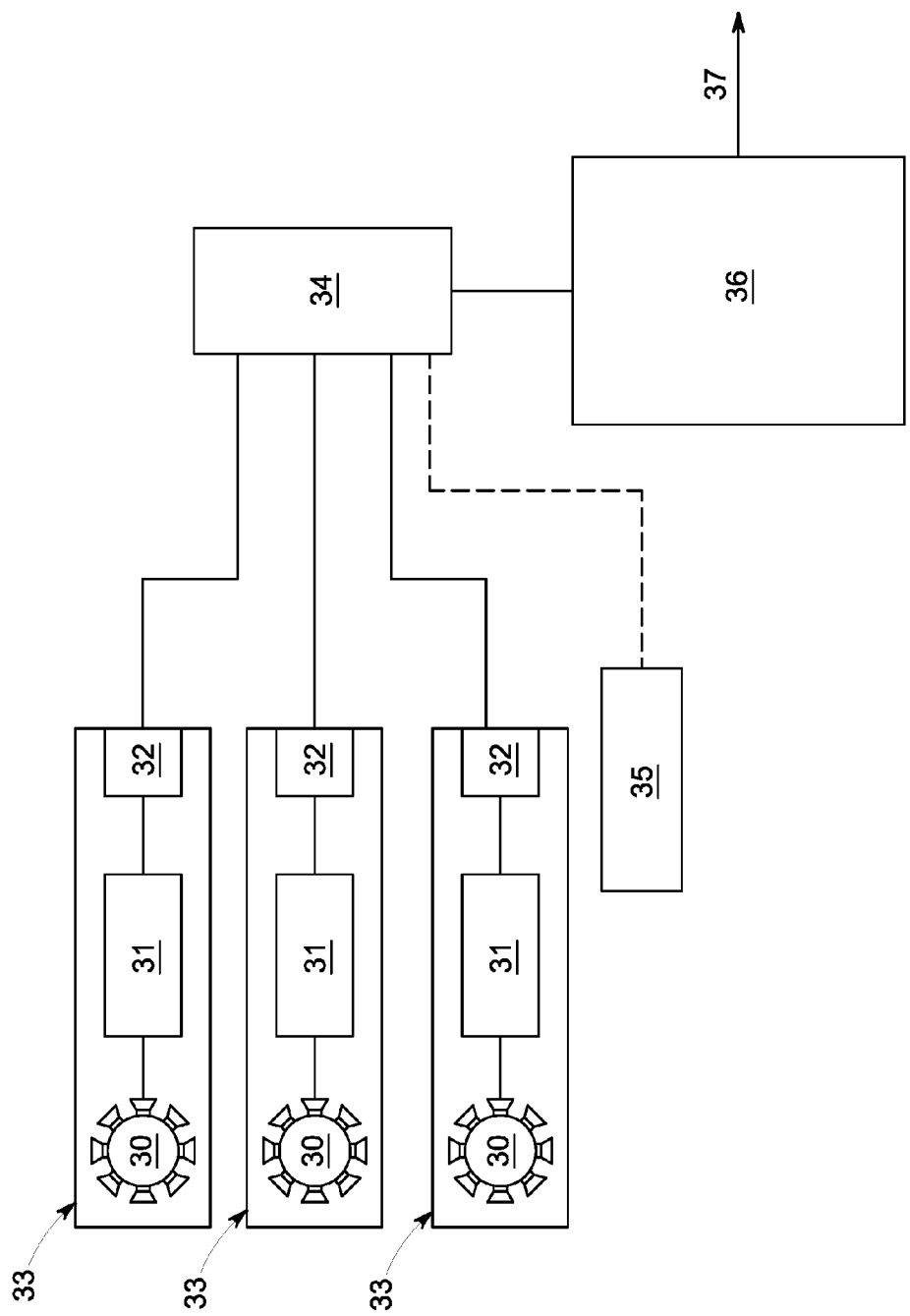
FIG. 3 illustrates an example machine schematic.

FIG. 3 represents a schematic overview of an example machine embodiment. An array of microphones 30 is operatively connected to an analog to digital data acquisition board that is 31 operatively connected to a digital transceiver port 32, forming an Acquisition array 33. Three acquisition arrays 33 are operatively connected to a transceiver/multiplexer 34 which is also connected to a complementary acquisition system 35. A complementary acquisition system might be active or passive, and is capable of receiving location or command input information from an environment and providing that information in a process-usable format. The transceiver/multiplexer 34 formats and sends received data to one or more command database and audio analysis engines 36 that subsequently analyze one or more elements, singly or in combination, such as: the audio data in real time, separates voice commands from background sounds, localizes the voice and sound sources, recognizes the voice, and converts the voice to a command. The database and analysis engine 36 then generates a command output 37. The command outputs can include one or more of: initiating automated equipment, altering information on a display, or changing the commands available to a user.

Figure 4:
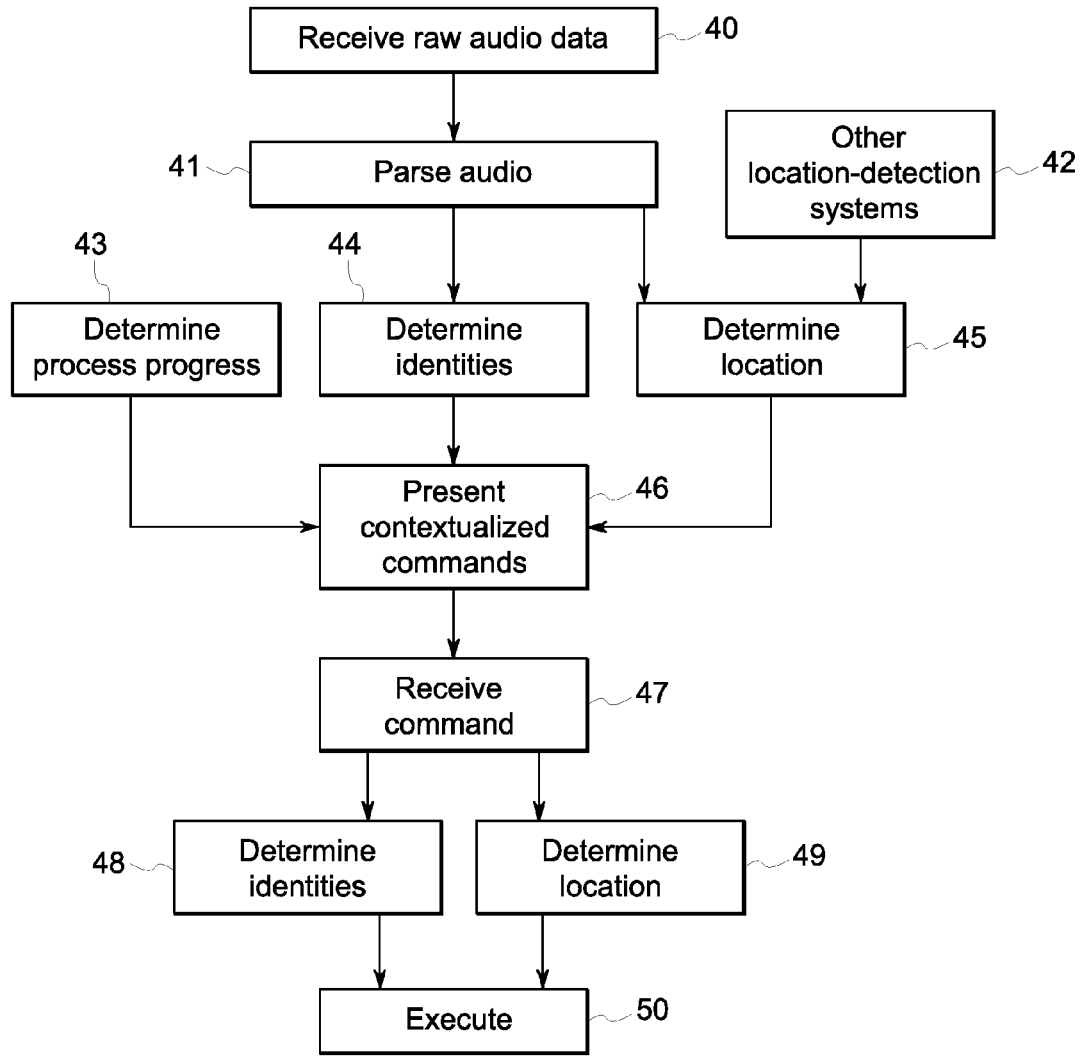
FIG. 4 is a method flow chart.

FIG. 4 is a flow chart demonstrating the method. Received raw audio data 40 is parsed 41 into component elements allowing for the determination of user identities 44 and user locations 45. Location determination may be supplemented with data from other location detection systems 42. Based upon prior executed commands, time, specific inputs, or other metrics, overall progress of a coordinated process is determined 43. The process progress 43, user identities 44, and locations 45, alone, or in combination, are then used to present contextualized commands 46 to a user. The system then receives a command through any input method 47, again determines relevant identities 48 and locations 49, singly or in tandem, and then executes 50 the command with any modifications imposed by identity or location. The contextualized commands 46 may be interchangeable with different command sets, localized to regional languages, and/or specific coordinated processes.

It is to be understood that the above descriptions are intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, values, and types of materials described herein are intended to illustrate embodiments of the invention, they are by no means limiting and are exemplary in nature. Other embodiments may be apparent upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system comprising:
   acoustical sensors disposed as an array, coupled to an analog to digital converter and a digital data output transceiver, forming an acoustic array sensor;
   at least one acoustic array sensor operatively connected to an audio analysis processor;
   the audio analysis processor operatively connected to a command database and a control module;
   the command and control module operatively connected to one or more automated machines;
   wherein multiple array sensors are distributed throughout a designated control area.

2. The system claim 1 operatively connected to a machine vision system configured to track the locations of passive and/or non-vocalizing active users.

3. The system of claim 1 wherein the audio analysis processor is configured to receive inputs from multiple audio acquisition arrays, and parse the inputs to determine at least one of the presence, identity, and location of multiple users relative to the positions of the audio acquisition arrays.

4. The system of claim 1 wherein the database is interchangeably localized to specific languages.

5. The system of claim 1 wherein the database is interchangeably configured to contain commands relevant to a particular process.

6. The system of claim 1 wherein the acoustic array sensors are distributed throughout multiple distinct environments containing at least one of a multiplicity of individual users and machines.

7. The system of claim 1 wherein non-vocal audio signals are used to at least one of identify, localize, and command automated machines responsive to the command and control module.

8. The system of claim 1 comprising at least two audio sensors oriented to cover a separated designated primary area, further oriented to allow for localization of an audio source based on the difference in signal arrival time.

9. An audio command and control method comprising:
   placing at least one acoustic array sensor in each of at least one distinct environment, said environment containing a multiplicity of users and automated equipment, said users engaged in a coordinated process;
   parsing the signals from at least one acoustic array sensor to determine the identities and locations of users and equipment;
   presenting to users a specialized command list tailored to location, user authority, and coordinated process timeline;
   engaging and positioning automated equipment in response to user command;
   limiting the engagement and position of automated equipment in response to a user, non-user, or equipment presence and location;
   presenting to users a specialized command list tailored to location, user authority, and coordinated process timeline;
   engaging and positioning automated equipment in response to user command; and
   limiting the engagement and position of automated equipment in response to user presence and location.

10. A process comprising:
    grouping audio sensors into an acoustical array sensor;
    placing at least one acoustical array sensor in proximity to multiple users;
    registering a first audio input from the at least one acoustical array sensor;
    recognizing a first user based upon the first audio input;
    localizing a first user based upon the first audio input into at least one acoustical array sensor;
    assigning an authority level to the first authorized user based upon the first audio input;
    presenting a list of commands available to the first authorized user based on the first audio input;
    enacting a chosen command, from the list of commands, based upon a second audio input from the first user, wherein enacting the chosen command comprises moving instrumentation;
    recognizing and localizing at least one additional user through vocal or non-vocal audio signal; and
    limiting the movement of the instrumentation based upon the locations of either the first user or at least one additional user.

11. The process of claim 10 wherein the audio sensors utilize non-vocal audio emissions from equipment to automate and track movement.

12. The process of claim 10 wherein the multiple users are engaged in a coordinated process.

13. The process of claim 12 wherein commands available to an individual user are based on at least one of location, user function, process type, and overall progress of the coordinated process.

14. The process of claim 10 wherein the enactment of a chosen command comprises at least one of altering information displayed to a user, altering a process variable, dictating a report, and recording a notation.

15. The process of claim 14 wherein the execution of the command is altered by the presence of one or more additional users proximate to the issuer of the command.

16. The process of claim 10 wherein multiple users are distributed between at least first and second environments with limited visibility or accessibility between the environments.

17. The process of claim 16 wherein available commands are localized to a particular environment.

18. The process of claim 16 wherein commands issued by a system user in a first environment are executed in the at least one additional environment.

19. The process of claim 18 wherein execution of commands in at least one additional environment are limited by the presence and locations of at least one additional user in at least one additional environment.

* * * * *